United States Patent
Kimura (10) Patent No.: US 7,019,792 B2
(45) Date of Patent: Mar. 28, 2006

(54) IMAGE DISPLAY APPARATUS (75) Inventor: Keishi Kimura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 589 days.

(21) Appl. No.: 10/055,892

(22) Filed: Jan. 28, 2002

(65) Prior Publication Data

US 2002/0113947 A1 Aug. 22, 2002

(30) Foreign Application Priority Data

Feb. 7, 2001 (JP) .............................. 2001-030509

(51) Int. Cl.
*H04N 3/27* (2006.01)
*H04N 5/44* (2006.01)
*H04N 5/46* (2006.01)

(52) U.S. Cl. ...................... 348/744; 348/554; 348/558; 348/711

(58) Field of Classification Search ........ 348/553–555, 348/558, 571–572, 607, 711, 744; H04N 3/27, H04N 5/44, 5/46
See application file for complete search history.

(56) References Cited

U.S. PATENT DOCUMENTS

| 5,790,096 | A | * | 8/1998 | Hill, Jr. ........................ 345/600 |
| 5,812,210 | A | * | 9/1998 | Arai et al. ................... 348/555 |
| 6,016,113 | A | * | 1/2000 | Binder ......................... 341/131 |
| 6,097,437 | A | * | 8/2000 | Hwang ......................... 348/441 |
| 6,137,537 | A | * | 10/2000 | Tsuji et al. ................... 348/554 |
| 6,188,440 | B1 | * | 2/2001 | Toujima et al. .............. 348/554 |
| 6,239,729 | B1 | * | 5/2001 | Takeuchi .................... 341/100 |
| 6,377,251 | B1 | * | 4/2002 | Takasu et al. ............... 345/204 |
| 6,466,272 | B1 | * | 10/2002 | Arai et al. ................... 348/555 |
| 6,577,348 | B1 | * | 6/2003 | Park ........................... 348/554 |
| 6,603,516 | B1 | * | 8/2003 | Fujiwara et al. ............ 348/558 |
| 6,704,009 | B1 | * | 3/2004 | Tachibana et al. .......... 345/213 |
| 2002/0057366 | A1 | * | 5/2002 | Oku et al. .................... 348/554 |
| 2002/0063807 | A1 | * | 5/2002 | Margulis ..................... 348/745 |
| 2002/0085120 | A1 | * | 7/2002 | Yamaguchi et al. ........ 348/558 |
| 2002/0093593 | A1 | * | 7/2002 | Perkes ......................... 348/553 |
| 2002/0105592 | A1 | * | 8/2002 | Felts et al. ................... 348/554 |
| 2003/0048385 | A1 | * | 3/2003 | Tomizawa et al. .......... 348/625 |
| 2003/0206242 | A1 | * | 11/2003 | Choi .......................... 348/441 |
| 2004/0150747 | A1 | * | 8/2004 | Sita ............................. 348/558 |

\* cited by examiner

*Primary Examiner*—Brian P Yenke
(74) *Attorney, Agent, or Firm*—Oliff & Berridge PLC (57) ABSTRACT

An image display apparatus responding to diverse video signals having different display conditions includes: a frequency characteristic adjustment module that adjusts a frequency component of an analog video signal included in a supplied video signal; an A/D conversion module that converts the analog video signal adjusted by the frequency characteristic adjustment module into a digital video signal; and an image display module that displays a resulting image based on the converted digital video signal. The frequency characteristic adjustment module has: a filter unit that is capable of varying the frequency characteristic; a display condition detection unit that detects the display condition proper to the supplied video signal; and a filter control unit that controls the frequency characteristic of the filter unit according to the detected display condition. This arrangement adequately prevents deterioration of the picture quality due to quantization noise with regard to diverse signals having different display conditions, thus ensuring display of high-quality images.

4 Claims, 6 Drawing Sheets

| Image Display Modes | | Selected Filters | Pixel Frequencies [MHz] | Fundamental Frequencies [MHz] | Triple Harmonic Frequencies [MHz] | Required Passage Bands |
|---|---|---|---|---|---|---|
| PC | VGA60 | LPF40 (fc=40MHz) | 25.175 | 12.588 | 37.763 | Triple Harmonic |
| | SVGA75 | LPF75 (fc=75MHz) | 49.500 | 24.750 | 74.250 | |
| | XGA70 | LPF120 (fc=120MHz) | 75.000 | 37.500 | 112.500 | |
| TV | | LPF10 (fc=10MHz) | 14.318 | 7.159 | 21.477 | Fundamental |
| HDTV | | LPF40 (fc=40MHz) | 74.250 | 37.125 | 111.375 | |

IMAGE DISPLAY APPARATUS

BACKGROUND OF THE INVENTION

1. Field of the Invention

The present invention relates to an image display apparatus responding to diverse video signals having different display conditions.

2. Description of the Related Art

The projector for projecting images is one of the projector-type display apparatuses that display magnified images generated by a computer on a screen. The projector converts analog video signals supplied from an external image supply apparatus into digital video signals, carries out various series of image processing, and generates video signals that can be supplied to a light modulator like an LCD (liquid crystal display). The projector actuates the LCD in response to a generated video signal and modulates light emitted from a light source, thereby displaying a projected image via a projection optical system onto the screen.

The projector is generally required to display images corresponding to video signals having diverse display conditions, for example, video signals generated by the computer corresponding to various formats like VGA, SVGA, and XGA as well as television signals (including high-vision signals) reproduced by video recorders, DVD (digital versatile disc) players, and other reproducing units.

In the process of converting the analog video signal into a digital video signal, quantization noise arises according to the sampling frequency and the frequency component included in the analog video signal. The quantization noise adversely affects the picture quality of the displayed image. It is accordingly preferable to omit the frequency component, which causes the quantization noise, from the analog video signal, prior to conversion of the analog video signal into the digital video signal.

In the structure of displaying images corresponding to diverse display conditions, the wide range of video signals having a relatively low frequency component to a relatively high frequency component are input as the supplied analog video signal. The important issue here is to prevent quantization noise, which may occur in each of the diverse display conditions that lead to input of the wide range of video signals having the relatively low frequency component to the relatively high frequency component.

This issue is not restricted to the projector but arises in any image display apparatus that converts analog video signals into digital video signals and utilizes the converted digital video signals to display images in response to video signals corresponding to diverse display conditions.

SUMMARY OF THE INVENTION

The object of the present invention is thus to provide a technique of adequately preventing deterioration of the picture quality due to quantization noise with regard to diverse video signals having different display conditions, thus ensuring display of high-quality images.

At least part of the above and the other related objects is attained by an image display apparatus responding to diverse video signals having different display conditions. The image display apparatus includes: a frequency characteristic adjustment module that adjusts a frequency component of an analog video signal included in a supplied video signal; an A/D conversion module that converts the analog video signal adjusted by the frequency characteristic adjustment module into a digital video signal; and an image display module that displays a resulting image based on the converted digital video signal. The frequency characteristic adjustment module has: a filter unit that is capable of varying the frequency characteristic; a display condition detection unit that detects the display condition proper to the supplied video signal; and a filter control unit that controls the frequency characteristic of the filter unit according to the detected display condition.

The arrangement of the present invention adequately prevents deterioration of the picture quality due to quantization noise with regard to diverse video signals having different display conditions, thus ensuring display of high-quality images in the image display apparatus that converts analog video signals into digital video signals and utilizes the converted digital video signals.

It is preferable that the display condition detection unit detects the display condition proper to the supplied video signal, based on statuses of a horizontal synchronizing signal and a vertical synchronizing signal included in the supplied video signal.

This arrangement facilitates detection of the display condition proper to the supplied video signal.

In accordance with one preferable application, the filter control unit controls the frequency characteristic of the filter unit, based on a frequency of a fundamental of the analog video signal defined by the detected display condition.

When the image expressed by the supplied video signal is a natural image, this arrangement ensures display of the image with high accuracy.

In accordance with another preferable application, the filter control unit controls the frequency characteristic of the filter unit to allow passage of at least a triple harmonic component having a frequency of 3 times the frequency of the fundamental, when the supplied video signal is a video signal supplied from the computer.

When the image expressed by the supplied video signal is an image corresponding to the video signal supplied from the computer, for example, a text image or a graphic image, this arrangement ensures display of the image with high accuracy.

In accordance with one preferable embodiment, the filter unit has multiple filters having different frequency characteristics; and a selector that selects one filter among the multiple filters. The filter control unit controls the selector to select a filter of a specific frequency characteristic corresponding to the detected display condition.

This simplifies construction of the filter unit that is capable of varying the frequency characteristic.

The image display apparatus having any of the above arrangements may be a projector that projects an image.

DESCRIPTION OF THE PREFERRED EMBODIMENTS

Figure 1:
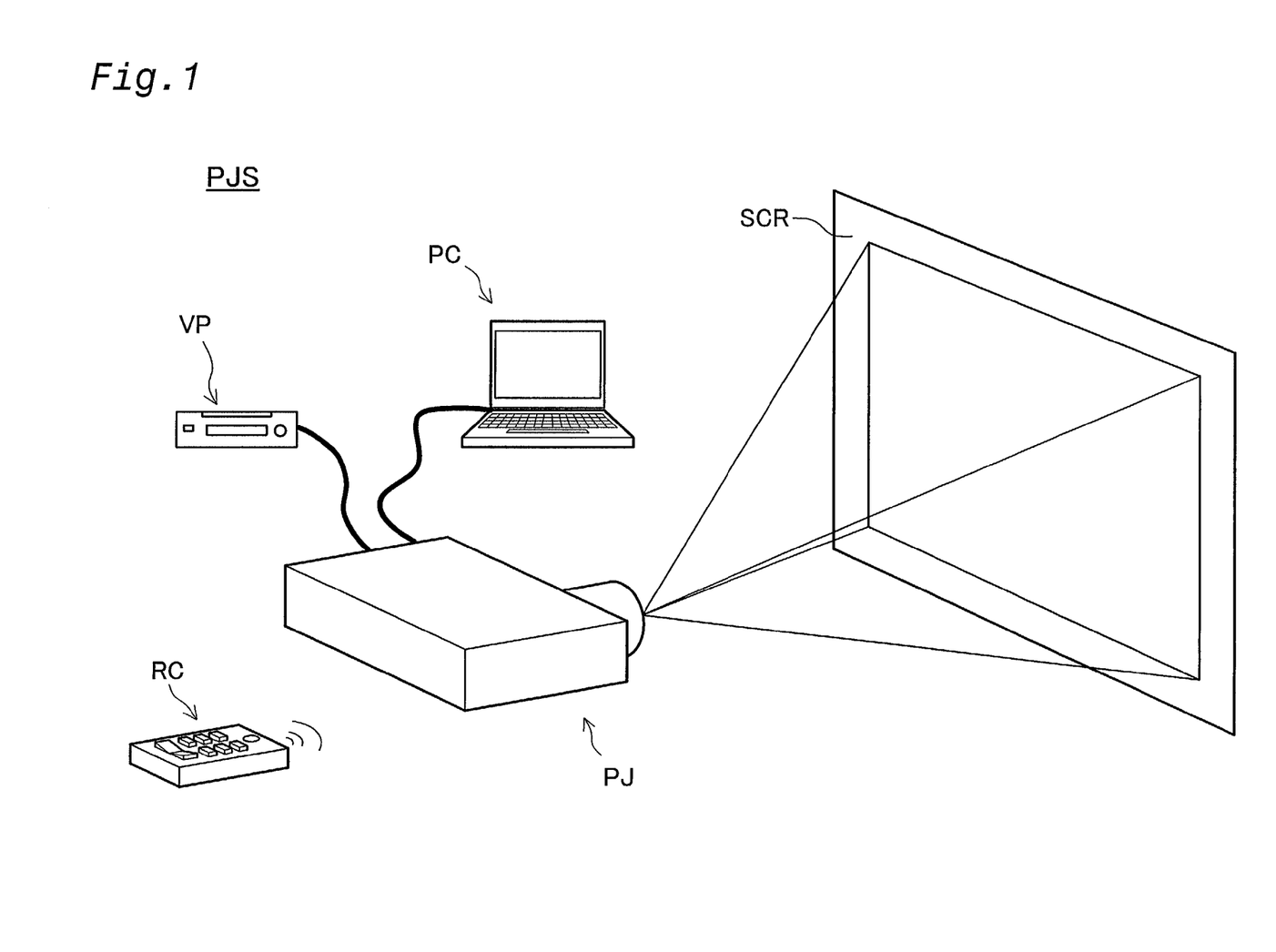
FIG. 1 illustrates the construction of a projection display system with a projector PJ in one embodiment of the present invention.

One mode of carrying out the present invention is discussed below as one preferred embodiment in the following sequence:
A. Construction of Projection Display System
B. Structure of Projector and Basic Operations
C. Structure of Filter Unit and Adjustment of Frequency Characteristics
D. Modified Structure of Filter Unit A. Construction of Projection Display System FIG. 1 illustrates the construction of a projection display system PJS with a projector in one embodiment of the present invention. The projection display system PJS includes a projector PJ, a screen SCR, as well as a personal computer PC and a video recorder VP functioning as image supply apparatuses.

The projector PJ is connected to the personal computer PC and the video recorder VP via signal lines and control lines. Images supplied from the personal computer PC and the video recorder VP to the projector PJ are projected on the screen SCR. The personal computer PC and the video recorder VP are connected to the projector PJ as the image supply apparatuses in this embodiment, they are not restrictive in any sense. Any of various reproducing units like DVD players and diverse computers are connectable.

A remote control RC is attached to the projector PJ. The user controls the operations of the projector PJ as well as the operations of the personal computer PC and the video recorder VP via the projector PJ through operations of the remote control RC.

B. Structure of Projector and Basic Operations

Figure 2:
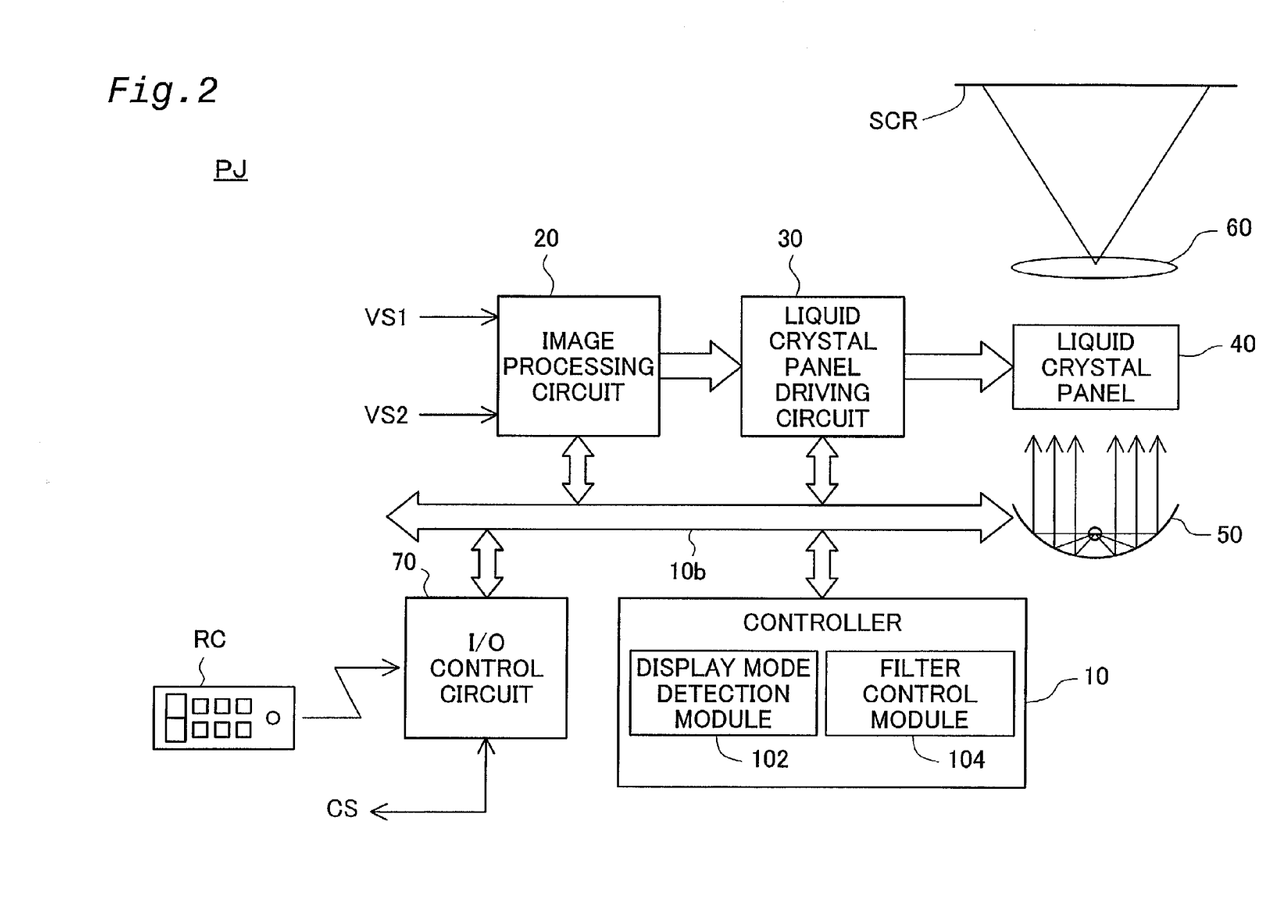
FIG. 2 is a block diagram schematically illustrating the internal structure of the projector PJ.

FIG. 2 is a block diagram schematically illustrating the internal structure of the projector PJ. The projector PJ includes a controller 10, an image processing circuit 20, a liquid crystal panel driving circuit 30, a liquid crystal panel 40, a lighting unit 50, a projection optical system 60, and an I/O control circuit 70.

The controller 10 is actualized by a microcomputer having a CPU and memories (not shown), and controls the operations of the image processing circuit 20, the liquid crystal panel driving circuit 30, the lighting unit 50, the projection optical system 60, and the I/O control circuit 70 via a bus 10b. For example, the controller 10 executes programs stored in the memory to exert the functions of a display mode detection module 102 and a filter control module 104.

The image processing circuit 20 generates video data, which can be supplied to the liquid crystal panel driving circuit 30, and executes diverse series of image processing according to the requirements.

Figure 3:
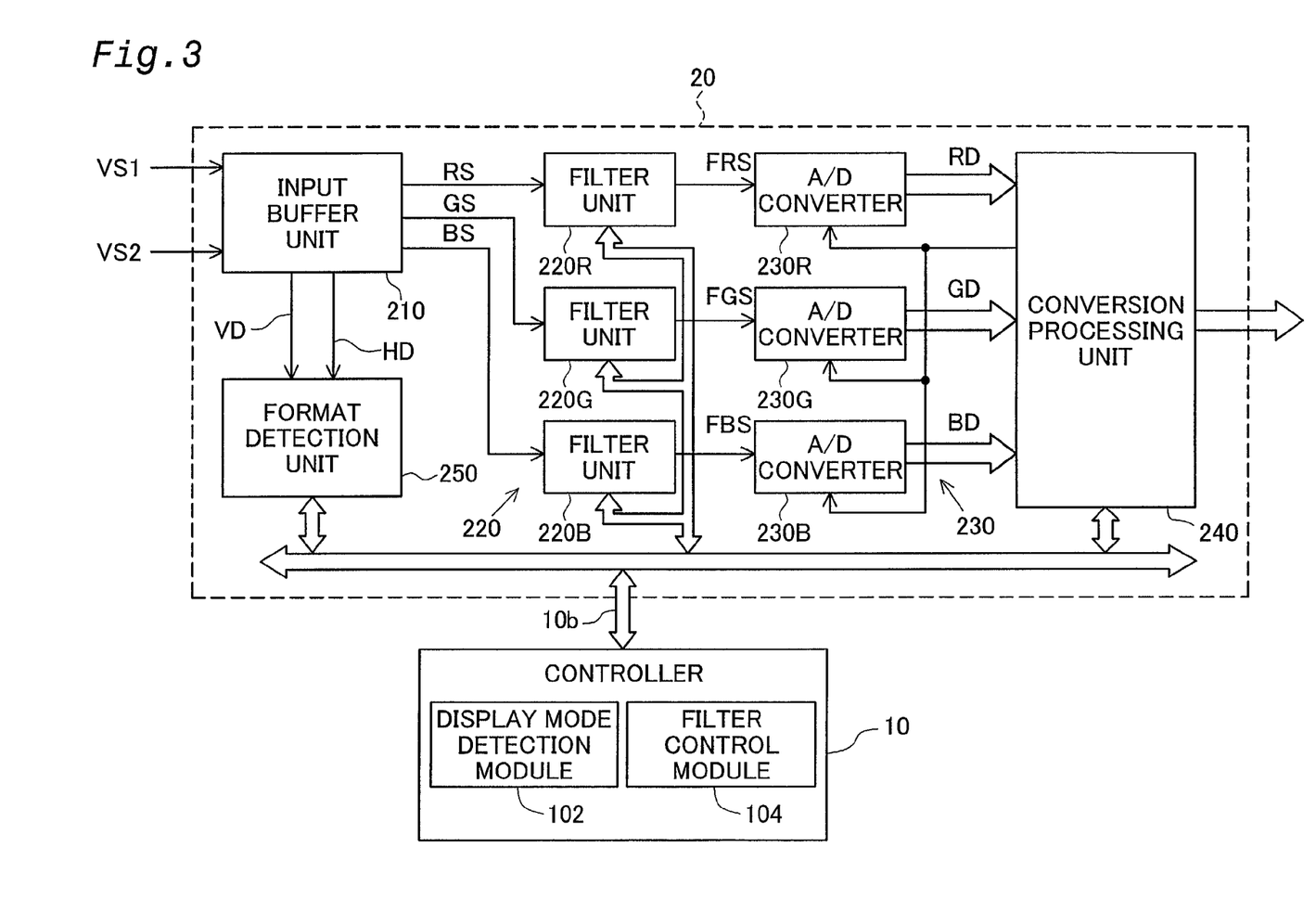
FIG. 3 is a block diagram illustrating the internal structure of an image processing circuit 20 included in the projector PJ.

FIG. 3 is a block diagram illustrating the internal structure of the image processing circuit 20. The image processing circuit 20 has an input buffer unit 210, a filter module 220, an A/D conversion unit 230, a conversion processing unit 240, and a format detection unit 250.

The input buffer unit 210 receives a video signal VS1 supplied from the computer PC or a video signal VS2 supplied from the video recorder VP and outputs analog video signals RS, GS, and BS of three colors red (R), green (G), and blue (B), a horizontal synchronizing signal HD, and a vertical synchronizing signal VD. Hereinafter the three color analog video signals may collectively be referred to as the RGB signal.

The input buffer unit 210 includes a non-illustrated selection circuit and selects either one of the video signals VS1 and VS2. The user may select the video signal through operations of the remote control RC.

Unless either one of the video signals VS1 and VS2 is a component signal, which includes the RGB signal, the horizontal synchronizing signal HD, and the vertical synchronizing signal VD separately from one another, the input buffer unit 210 divides the video signal VS1 or VS2 into the RGB signal, the horizontal synchronizing signal HD, and the vertical synchronizing signal VD.

The RGB signal output from the input buffer unit 210 is input into the filter module 220. The filter module 220 includes three filter units 220R, 220G, and 220B which the three color analog video signals RS, GS, and BS enter respectively. The filter units 220R, 220G, and 220B adjust the frequency components of the input analog video signals RS, GS, and BS of the respective colors as discussed later.

Three color analog video signals FRS, FRG, and FRB output from the three color filter units 220R, 220G, and 220B are input into the A/D conversion unit 230. The A/D conversion unit 230 includes three A/D converters 230R, 230G, and 230B, which respectively receive the three color analog video signals FRS, FRG, and FRB. The respective A/D converters 230R, 230G, and 230B convert the input three color analog video signals FRS, FRG, and FRB into digital video signals RD, GD, and BD.

The three color digital video signals RD, GD, and BD output from the A/D conversion unit 230 are input into the conversion processing unit 240. The conversion processing unit 240 generates video data, which can be supplied to the liquid crystal panel driving circuit 30, based on the three color digital video signals RD, GD, and BD.

The format detection unit 250 detects the signal formats, such as the frequencies and the signal polarities, of the horizontal synchronizing signal HD and the vertical synchronizing signal VD and transfers the results of the detection to the display mode detection module 102 in the controller 10. The display mode detection module 102 identifies an image display mode (display condition) based on the results of the detection transferred from the format detection unit 250. The format detection unit 250 and the display mode detection module 102 correspond to the display condition detection module of the present invention.

The filter control module 104 in the controller 10 controls the respective filter units 220R, 220G, and 220B based on the identified image display mode as discussed below.

The liquid crystal panel driving circuit 30 shown in FIG. 2 generates a driving signal for driving the liquid crystal panel 40 according to video data supplied from the image processing circuit 20. The liquid crystal panel 40 functions as a light valve (light modulation device) that modules light emitted from the lighting unit 50 in response to the driving signal output from the liquid crystal panel driving circuit 30. The brightness of the light emitted from the lighting unit 50 is adjustable by the controller 10.

The light modulated by the liquid crystal panel 40 is directed toward the screen SCR as a ray representing an image (image ray) by means of the projection optical system 60. An image is accordingly projected on the screen SCR. The magnification of projection by the projection optical system 60 is adjustable by the controller 10.

The liquid crystal panel driving circuit 30, the liquid crystal panel 40, the lighting unit 50, and the projection optical system 60 correspond to the image display module of the present invention.

Although not specifically shown in the illustration, the liquid crystal panel 40 includes three liquid crystal panels corresponding to the three colors RGB. The image processing circuit 20 and the liquid crystal panel driving circuit 30 accordingly have the function of processing video signals of the three colors RGB. The lighting unit 50 has a color light separation optical system that separates light emitted from a light source into three color rays. The projection optical system 60 has a composite optical system that combines three color image rays to generate a composite image beam representing a color image and a projection lens. Any of typical structures in the optical system of the projector is applicable for this projection optical system 60.

The I/O control circuit 70 transfers commands and data, which are included in infrared signals transmitted from the remote control RC and received by a non-illustrated receiving unit, to the controller 10. The controller 10 performs required operations in response to the commands and data thus transferred. The I/O control circuit 70, the personal computer PC, and the video recorder VP are connected to allow mutual transmission of control signals CS and thereby mutual control of their operations.

C. Structure of Filter Unit and Adjustment of Frequency Characteristics

Figure 4:
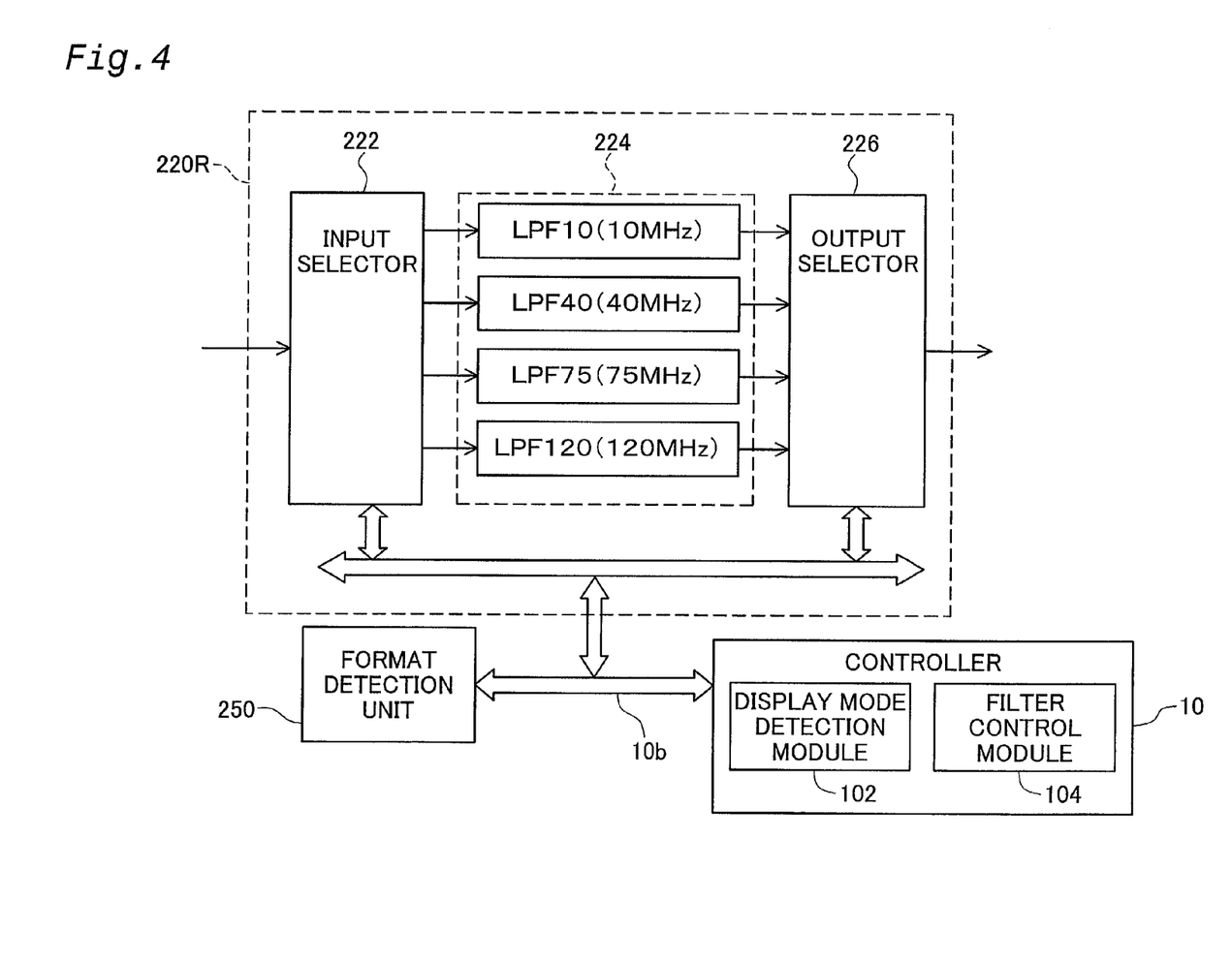
FIG. 4 is a block diagram illustrating the internal structure of a filter unit 220R corresponding to an R signal RS, which is included in the image processing circuit 20.

FIG. 4 is a block diagram illustrating the internal structure of the filter unit 220R corresponding to the R signal RS. The other filter units 220G and 220B corresponding to the G signal GS and the B signal BS have an identical structure with that of the filter unit 220R. The following thus regards only the structure of the filter unit 220R corresponding to the R signal RS.

The filter unit 220R includes an input selector 222, a filter circuit 224, and an output selector 226. The filter circuit 224 has four filters LPF10, LPF40, LPF75, and LPF120. These filters LPF10, LPF40, LPF75, and LPF120 are low pass filters having cut-off frequencies fc of 10 MHz, 40 MHz, 75 MHz, and 120 MHz. Each filter may be actualized by any of commercially available filter elements, for example, chip EMI suppression filters FK2125T series and FK2125TZ series (manufactured by Taiyo Yuden Co., Ltd.) Diverse filters may be obtained by combining various discrete parts.

The input selector 222 and the output selector 226 function as the selection module for selecting one corresponding filter among the multiple filters included in the filter circuit 224, based on selection data supplied from the filter control module 104 in the controller 10.

Figure 5:
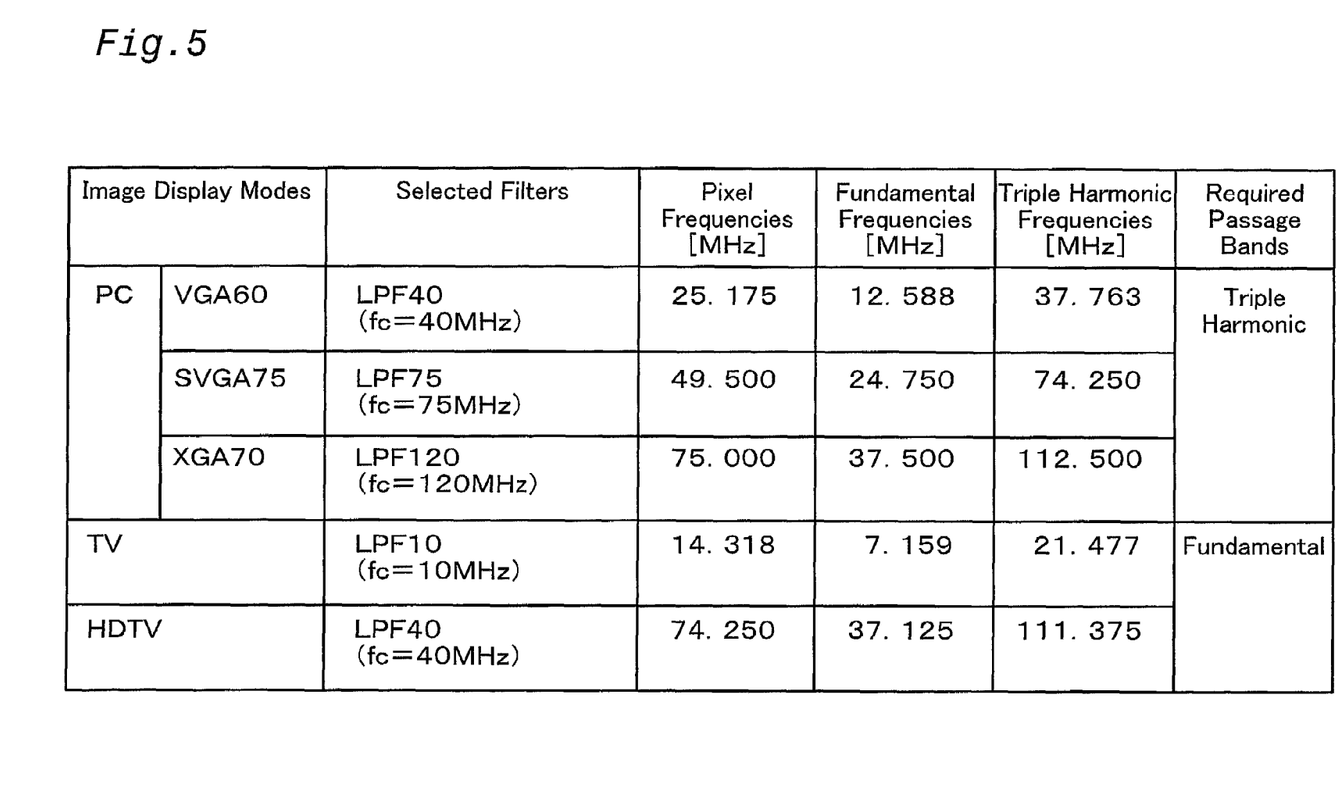
FIG. 5 shows a mapping of the image display mode to the selected filter.

FIG. 5 shows a mapping of the image display mode to the selected filter. The filters LPF40, LPF75, LPF120, LPF10, and LPF40 are selected corresponding to image display modes VGA60, SVGA75, XGA70, TV, and HDTV, respectively. Selection of the filter follows the procedure discussed below.

The horizontal synchronizing signal HD and the vertical synchronizing signal VD have different signal formats, such as frequencies and signal polarities, in different image display modes. The image display mode is thus identified by checking the state of the signal format. The display mode detection module 102 identifies the image display mode (display condition) based on the results of detection (the state of the signal format) transferred from the format detection unit 250. The identification is carried out by referring to an image display mode detection table stored in the non-illustrated memory included in the controller 10. The image display mode detection table is a database representing the relationship between the image display mode and the signal format.

The filter control module 104 in the controller 10 controls the input selector 222 and the output selector 226 of the filter unit 220R, based on selection data of the filter corresponding to result of the identification (the image display mode) by the display mode detection module 102, and thereby selects one corresponding filter among the multiple filters included in the filter circuit 224. The frequency characteristics of the filter unit 220R are thus regulated according to the image display mode. The selection data is obtained by referring to a selection data table stored in the non-illustrated memory included in the controller 10. The selection data table is a database representing the relationship between the image display mode and the selection data.

The cut-off frequency fc of the filter selected corresponding to each image display mode of the filter unit 220R is set as discussed below.

In order to display text images and graphic images expressed by video signals supplied from the personal computer PC with high accuracy, it is preferable to allow passage of not only a fundamental wave having a frequency f1, which is half a frequency fclk of a pixel clock included in the video signal, but its higher harmonic component through the filter unit 220R. The harmonic wave of excessively high frequency, however, causes quantization noise like alias noise while the harmonic wave is quantized by the A/D converter 230R. It is accordingly preferable to prohibit passage of the higher harmonic component affecting the quantization noise. When the image display mode corresponds to video signals supplied from the personal computer PC, the preferable settings of the frequency characteristics in the filter unit 220R suppress the higher harmonic component than a triple harmonic frequency f3. For example, as shown in FIG. 5, in the image display mode of VGA60, the triple harmonic frequency f3 is 37.763 MHz, so that the filter LPF40 having the cut-off frequency fc of 40 MHz is selected. In another example, in the image display mode of SVGA75, the triple harmonic frequency f3 is 74.250 MHz, so that the filter LPF75 having the cut-off frequency of 75 MHz is selected. In the image display mode of SXGA70, the triple harmonic frequency f3 is 112.500 MHz, so that the filter LPF120 having the cut-off frequency of 120 MHz is selected.

In order to display natural images expressed by television signals and high vision signals supplied from the video recorder VP with high accuracy, suppression of the noise effect is preferable over passage of the signal component of high frequency. When the image display mode corresponds to the television signals and high vision signals supplied from the video recorder VP, the preferable settings of the frequency characteristics in the filter unit 220R allow passage of the fundamental wave having the frequency f1 while suppressing the higher harmonic component than the frequency f1 of the fundamental wave. For example, as shown in FIG. 5, in the image display mode of TV, since the frequency f1 of the fundamental wave is 7.159 MHz, the filter LPF10 having the cut-off frequency fc of 10 MHz is selected. In the image display mode of HDTV, since the frequency f1 of the fundamental wave is 37.125 MHz, the filter LPF40 having the cut-off frequency fc of 40 MHz is selected.

The filter unit 220R of this embodiment deals with the five different image display modes shown in FIG. 5, although this arrangement is not restrictive. The filter unit 220R may have a greater number of filters to deal with a greater number of image display modes.

The above embodiment regards the application of selecting an adequate filter among the filters having different cut-off frequencies corresponding to the image display mode. The technique of the present invention is, however, not restricted to this arrangement. Another application may select an adequate filter among filters having any of different structures and different frequency characteristics (for example, cut-off frequencies and damping characteristics) corresponding to the image display mode. In the above example, the same filter LPF40 is selected in the different image display modes of VGA60 and HDTV. As discussed previously, the characteristics of the video signals supplied from the personal computer PC are often different from those of the television signals (including the high vision signals). An adequate filter is accordingly selected among filters having an identical cut off frequency fc but different damping characteristics according to the signal characteristics. This arrangement ensures selection of the filter having the more adequate frequency characteristics corresponding to the image display mode.

D. Modification of Filter Unit

Figure 6:
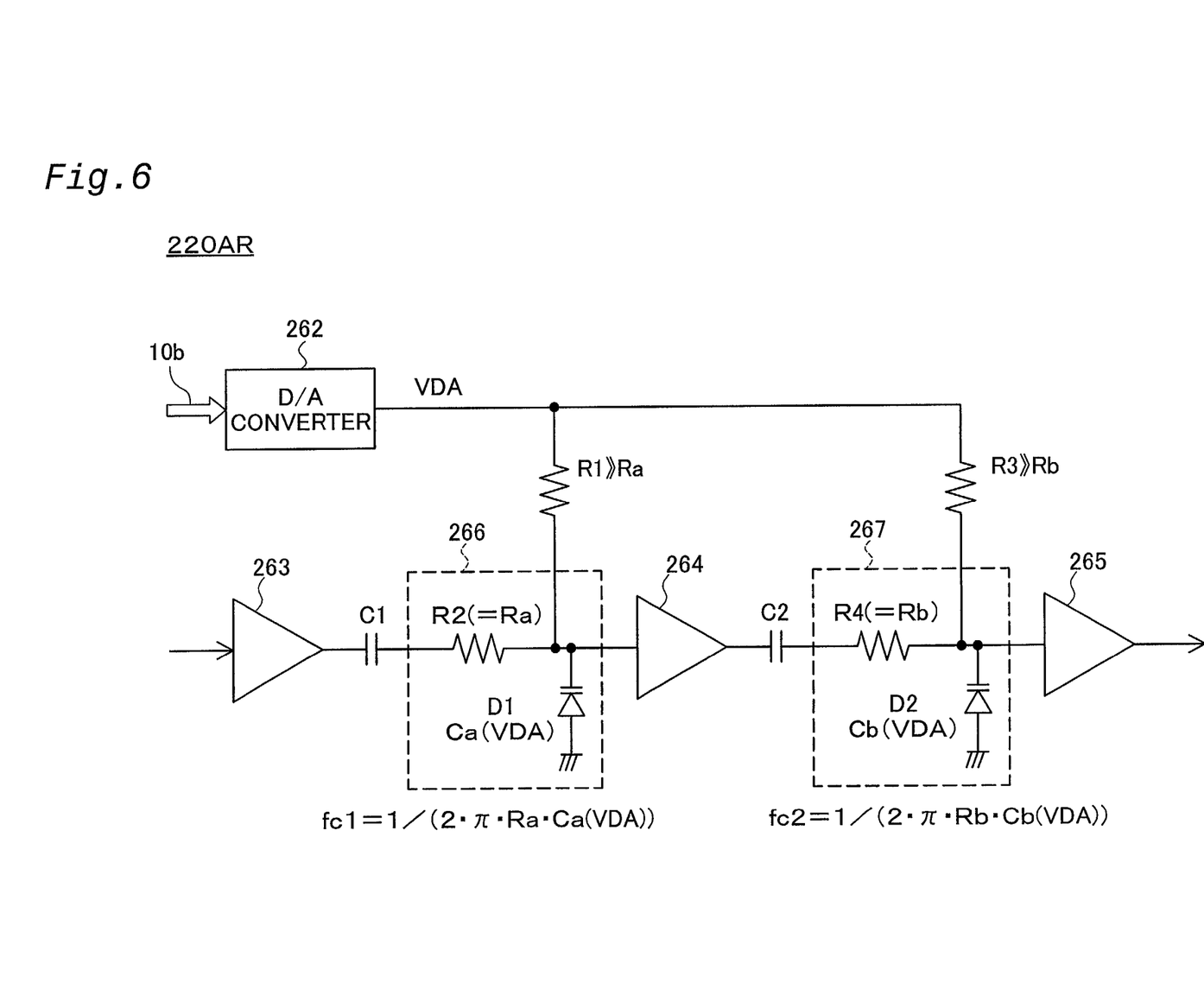
FIG. 6 is a block diagram illustrating a modified structure of the filter unit 220R.

FIG. 6 is a block diagram illustrating a modified structure of the filter unit 220R. This modified filter unit 220AR has three buffer amplifiers 263, 264, and 265, two filters 266 and 267, and a D/A converter 262.

Output of the first buffer amplifier 263 is connected to input of the first filter 266 via a coupling capacitor C1. Output of the first filter 266 is connected to input of the second buffer amplifier 264. Output of the second buffer amplifier 264 is connected to input of the second filter 267 via a coupling capacitor C2. Output of the second filter 267 is connected to input of the third buffer amplifier 265.

The first filter 266 is a primary low-pass filter including a resistance R2 and a variable capacitance diode D1. A cut-off frequency fc1 of the first filter 266 is expressed by an equation given below, where Ra denotes the value of the resistance R2, VDA denotes an output voltage from the D/A converter 262, and Ca(VDA) denotes the capacity of the variable capacitance diode D1:

$$fc1=1/(2 \cdot \pi \cdot Ra \cdot Ca(VDA))$$

A value equivalently approximated to non-conduction in the frequency band of the input signal, that is, a value significantly greater than the value Ra of the resistance R2 is set to the value of a resistance R1.

The capacity Ca(VDA) of the variable capacitance diode D1 varies with a variation in output voltage VDA from the D/A converter 262. The cut-off frequency fc1 of the first filter 266 accordingly varies with a variation in output voltage VDA.

The second filter 267 is also a primary low-pass filter including a resistance R4 and a variable capacitance diode D2. Like the first filter 266, a cut-off frequency fc2 of the second filter 267 is expressed by an equation given below, where Rb denotes the value of the resistance R4, VDA denotes the output voltage from the D/A converter 262, and Cb(VDA) denotes the capacity of the variable capacitance diode D2:

$$fc2=1/(2 \cdot \pi \cdot Rb \cdot Cb(VDA))$$

The value of a resistance R3 is set to be significantly greater than the value Rb of the resistance R4.

The capacity Cb(VDA) of the variable capacitance diode D2 also varies with the variation in output voltage VDA from the D/A converter 262. The cut-off frequency fc2 of the second filter 267 accordingly varies with the variation in output voltage VDA.

A cut-off frequency fc of this modified filter unit 220AR is thus varied by varying the cut-off frequencies fc1 and fc2 of the first filter 266 and the second filter 267.

As clearly understood from the above description, this filter unit 220AR regulates the output voltage VDA from the D/A converter 262 to adjust the frequency characteristics.

The above embodiment and its modifications are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein. The above embodiment regards the projector for projecting images. The technique of the present invention is, however, not restricted to the projector but may be applicable to diverse image display apparatuses.

The scope and spirit of the present invention are indicated by the appended claims, rather than by the foregoing description.

What is claimed is:

1. An image display apparatus responding to diverse video signals having different display conditions, the image display apparatus comprising:
   a frequency characteristic adjustment module that adjusts a frequency component of an analog video signal included in a supplied video signal:
   an A/D conversion module that converts the analog video signal adjusted by the frequency characteristic adjustment module into a digital video signal; and
   an image display module that displays a resulting image based on the converted digital video signal,
   wherein the frequency characteristic adjustment module comprises:
   a filter unit that is capable of varying the frequency characteristic;
   a display condition detection unit that detects the display condition proper to the supplied video signal, and the display condition detection unit detects the display condition proper to the supplied video signal, based on statuses of a horizontal synchronizing signal and a vertical synchronizing signal included in the supplied video signal; and
   a filter control unit that controls the frequency characteristic of the filter unit according to the detected display condition, and the filter control unit controls the frequency characteristic of the filter unit, based on a frequency of a fundamental of the analog video signal defined by the detected display condition, and the filter control unit controls the frequency characteristic of the filter unit to allow passage of at least a triple harmonic component having a frequency of 3 times the frequency of the fundamental, when the supplied video signal is a video signal supplied from the computer.

2. An image display apparatus in accordance with claim 1, wherein the filter unit comprises:
   multiple filters having different frequency characteristics; and
   a selector that selects one filter among the multiple filters, and the filter control unit controls the selector to select a filter of a specific frequency characteristic corresponding to the detected display condition.

3. An image display apparatus in accordance with claim 2, the image display apparatus is a projector that projects an image.

4. An image display apparatus in accordance with claim 1, the image display apparatus is a projector that projects an image.

* * * * *